No. 757,855. PATENTED APR. 19, 1904.
F. WIENKE.
PLOW.
APPLICATION FILED JUNE 30, 1903.
NO MODEL.
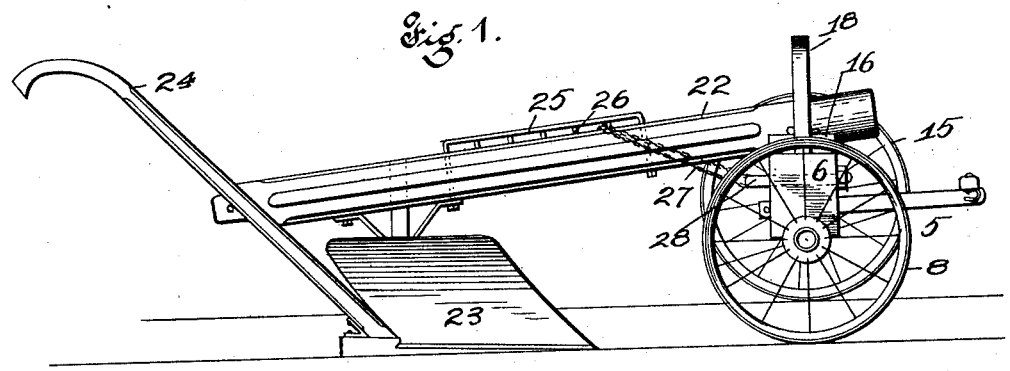
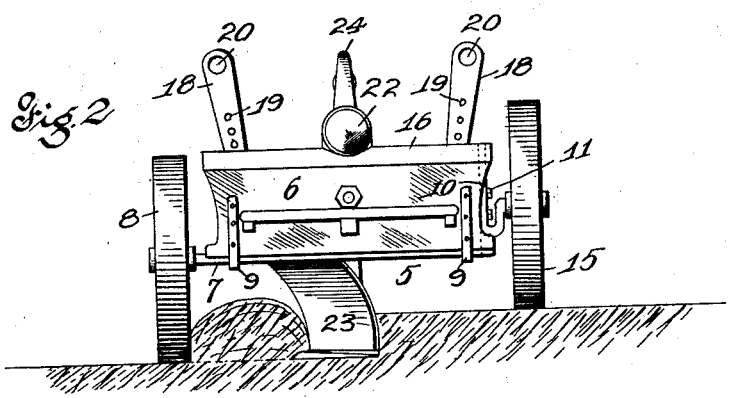
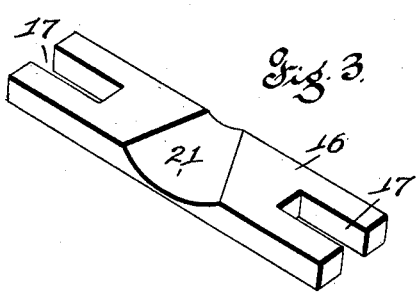
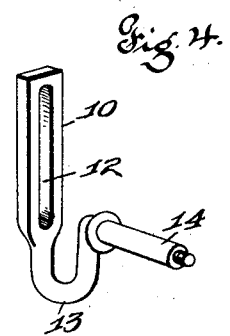
Witnesses
Alfred A. Eicks
M. Selvin
Inventor
Ferdinand Wienke
by Higdon & Longan & Hopkins
attys.

No. 757,855.

Patented April 19, 1904.

UNITED STATES PATENT OFFICE.

FERDINAND WIENKE, OF ODIN, ILLINOIS.

PLOW.

SPECIFICATION forming part of Letters Patent No. 757,855, dated April 19, 1904.

Application filed June 30, 1903. Serial No. 163,712. (No model.)

*To all whom it may concern:*

Be it known that I, FERDINAND WIENKE, a citizen of the United States, residing at Odin, Marion county, State of Illinois, have invented certain new and useful Improvements in Plows, of which the following is a specification containing a full, clear, and exact description, reference being had to the accompanying drawings, forming a part hereof.

My invention relates to improvements in plows; and it consists in the novel arrangement, construction, and combination of parts, as will be fully hereinafter described and claimed.

The object of my invention is to construct an improved plow provided with a truck whereby one wheel of said truck can be adjusted and the plow regulated to cut various depths of furrows.

Figure 1 is a side elevation of my complete invention. Fig. 2 is a front view of the same. Fig. 3 is a detail perspective view of the adjustable bed-plate made use of in carrying out my invention. Fig. 4 is a detail perspective view of the adjustable axle made use of in carrying out my invention.

In the construction of the device as shown I provide a truck 5, composed of the bolster 6, supporting the axle 7, upon which the wheel 8 is carried. The axle 7 is rigidly held upon the bolster 6 by means of the clips 9. The opposite end of the bolster 6 is provided with a vertical groove in which the flattened end 10 of the adjustable axle is embedded and is allowed to be adjusted therein by means of the set-screws 11, passing through the elongated slot 12, formed in said flattened member. The adjustable axle is bent U-shaped at the point indicated by the numeral 13 and is then bent outwardly at right angles, forming the axle portion 14, upon which the wheel 15 is carried. The purpose of the adjustable axle is to regulate the truck, keeping it at all times in horizontal position, the wheel 8 running in the furrow or cut-out portion of the land and the wheel 15 running on the uncut portion.

Upon the bolster 6 is mounted the bed-plate 16, its both ends provided with slots 17, which fit around the posts 18. The posts are rigidly mounted in the bolster and are provided with a plurality of holes 19, through which pins are adapted to be placed, the purpose being to hold the bed-plate 16 in its adjusted position when elevated to the various holes. In the top of the posts are openings 20, through which the reins are passed.

At the center of the bed-plate 16 is provided a tapered recess 21, in which rests the free end of the plow-beam 22, to which is secured the plowshare 23 and a handle 24. Upon the plow-beam 22 is provided the draft-rod 25, provided with a plurality of projecting trunnions 26, forming equal spaces through which the chains 27 are passed and held by the hook or eye 28, carried by the bolster 6. The purpose of the chain 27 and the draft-rod 25 is to regulate the adjustment between the plowshare and the truck to guide said plowshare, making a shallow or a deep furrow and at the same time drawing said plow.

The operation of my invention is as follows: The operator after making the first furrow will then adjust the wheel 15 to bring the truck in a horizontal position, as shown in Fig. 2. He then regulates the chain, either shortening or lengthening it and raising the bed-plate to the desired height of the furrow to be made. When once adjusted, the plowing of the field is continued without a readjustment until the work has been completed, and then the operator lowers the wheel 15 on a level with the wheel 8, removes the chain 27, and places it in the last space of the draft-rod, which will tilt the plowshare, bringing it out of contact with the earth, and in this manner the plow is conveyed back to the shed.

Having fully described my invention, what I claim is—

1. In a plow, the bolster 6, means of mounting said bolster on wheels, posts extending upwardly from the bolster; a bed-plate mounted to be adjusted up and down upon said posts; a plowshare; a plow-beam attached to the plowshare and having its forward end carried by said bed-plate, so that the cutting depth of the plowshare may be regulated by adjusting the height of the bed-plate; and an adjustable connection between the bolster and the plow-beam, so that the distance between the plowshare and the bolster may be regulated, substantially as specified.

2. The improved plow comprising the bolster 6, an axle, suitable supporting-wheels, the bed-plate 16 having its ends provided with slots 17, vertical bars 18, means of adjusting the bed-plate up and down on the vertical bars, said bed-plate having a tapered recess 21 at the center of its length, and the plow-beam resting within said recess, substantially as specified.

3. In a plow, a bolster; suitable supporting-wheels for the bolster; posts extending upwardly from the bolster; a bed-plate mounted to be adjusted up and down upon said posts; a plowshare; a plow-beam attached to the plowshare, and having its forward end supported upon said bed-plate; a series of trunnions projecting upwardly from the plow-beam; a chain attached to the bolster and adjustably engaging said trunnions, substantially as specified.

In testimony whereof I have signed my name to this specification in presence of two subscribing witnesses.

FERDINAND WIENKE.

Witnesses:
ALFRED A. EICKS,
M. G. IRION.